United States Patent [19]

Suzuki

[11] Patent Number: 5,742,324
[45] Date of Patent: Apr. 21, 1998

[54] EXPOSING DEVICE HAVING POWER CONTROLLER FOR CONTROLLING LASER POWER DURING DOT EXPOSING CYCLE IN AN ELECTROPHOTOGRAPHIC PROCESS

[75] Inventor: Hidenobu Suzuki, Nimazu, Japan

[73] Assignee: Kabushiki Kaisha TEC, Shizuoka, Japan

[21] Appl. No.: 439,466

[22] Filed: May 11, 1995

[30] Foreign Application Priority Data

May 11, 1994 [JP] Japan ..................... 6-097181

[51] Int. Cl.$^6$ ........................................ B41J 2/47
[52] U.S. Cl. ............................. 347/247; 347/251
[58] Field of Search .............................. 347/131, 132, 347/251, 253, 247; 358/298

[56] References Cited

U.S. PATENT DOCUMENTS

| | | | |
|---|---|---|---|
| 4,051,536 | 9/1977 | Roetling | 358/298 |
| 4,492,966 | 1/1985 | Seki et al. | 356/33 A |
| 4,594,596 | 6/1986 | Takahashi et al. | 346/76 L |
| 5,045,952 | 9/1991 | Eschbach | 358/447 |
| 5,293,207 | 3/1994 | Haneda | 355/327 |
| 5,361,089 | 11/1994 | Bearss et al. | 346/160 |
| 5,448,278 | 9/1995 | Tanimoto et al. | 347/129 |
| 5,479,175 | 12/1995 | Cianciosi et al. | 347/252 |
| 5,532,827 | 7/1996 | Kajitani et al. | 358/298 |
| 5,565,995 | 10/1996 | Yamada et al. | 358/298 |

FOREIGN PATENT DOCUMENTS 2-111912   4/1990   Japan.
4-323052   11/1992  Japan.

*Primary Examiner*—Safet Metjahic
*Assistant Examiner*—Christopher E. Mahoney
*Attorney, Agent, or Firm*—Frishauf, Holtz, Goodman, Langer & Chick

[57] ABSTRACT

An exposing device includes a laser light source section for emitting a laser beam, an optical scanning section for scanning a surface of a photosensitive drum in one direction with the laser beam emitted from the laser light source section, and a light source driving section for selectively driving the laser source in dot exposing cycles to form one of an exposure dot and non-exposure dot on the surface of the photosensitive drum within a scanning range of the optical scanning section. Particularly, the light source driving section incudes a laser control circuit for changing a laser power of the laser beam in a predetermined control pattern during each dot exposing cycle assigned to form an exposure dot adjacent to a non-exposure dot. The control pattern is predetermined such that the laser power is changed from a first level to a second level lower than the first level in a first half of the dot exposing cycle, and from the second level to the first level in the remaining half of the dot exposing cycle.

3 Claims, 5 Drawing Sheets

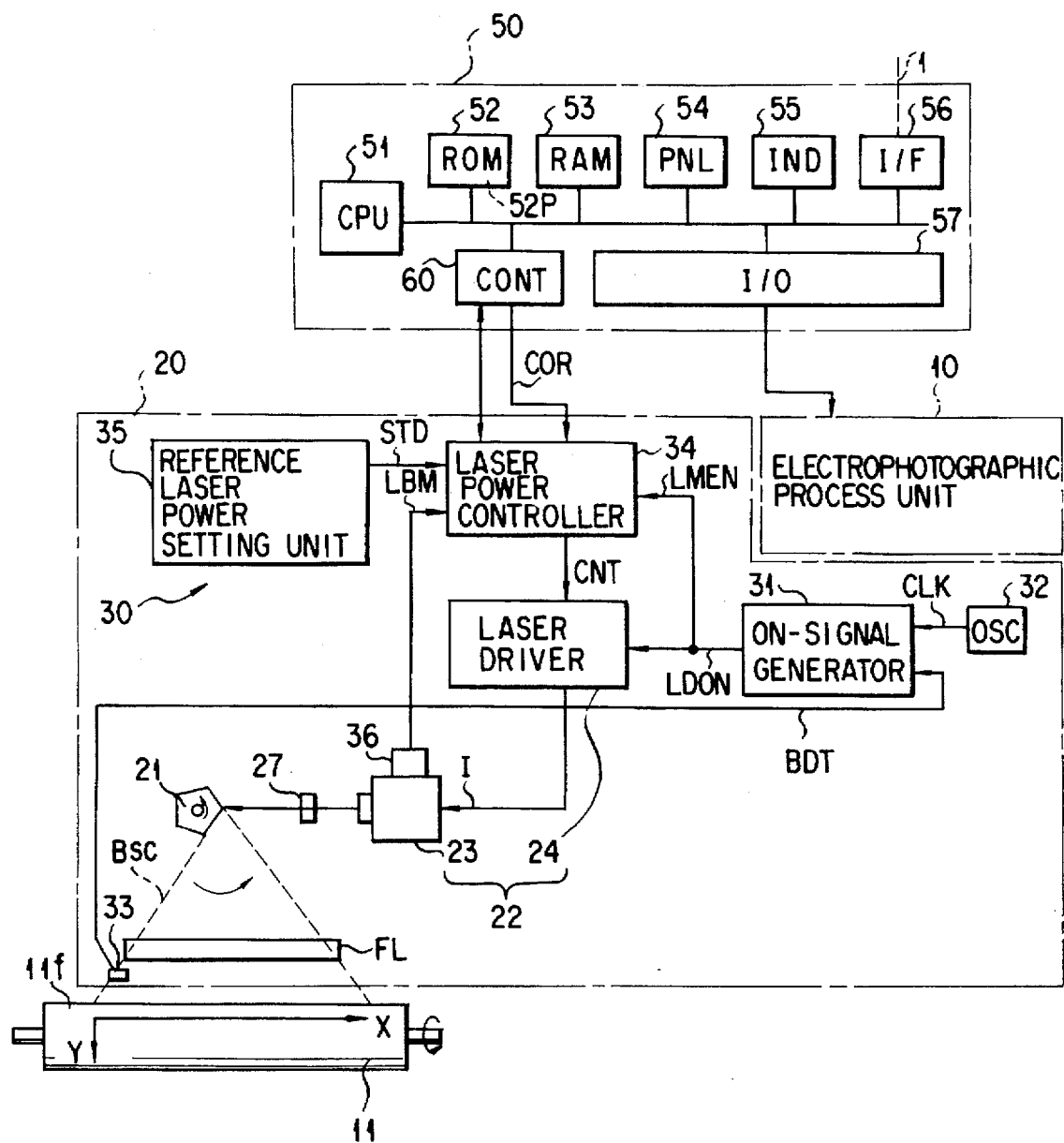
F I G. 4

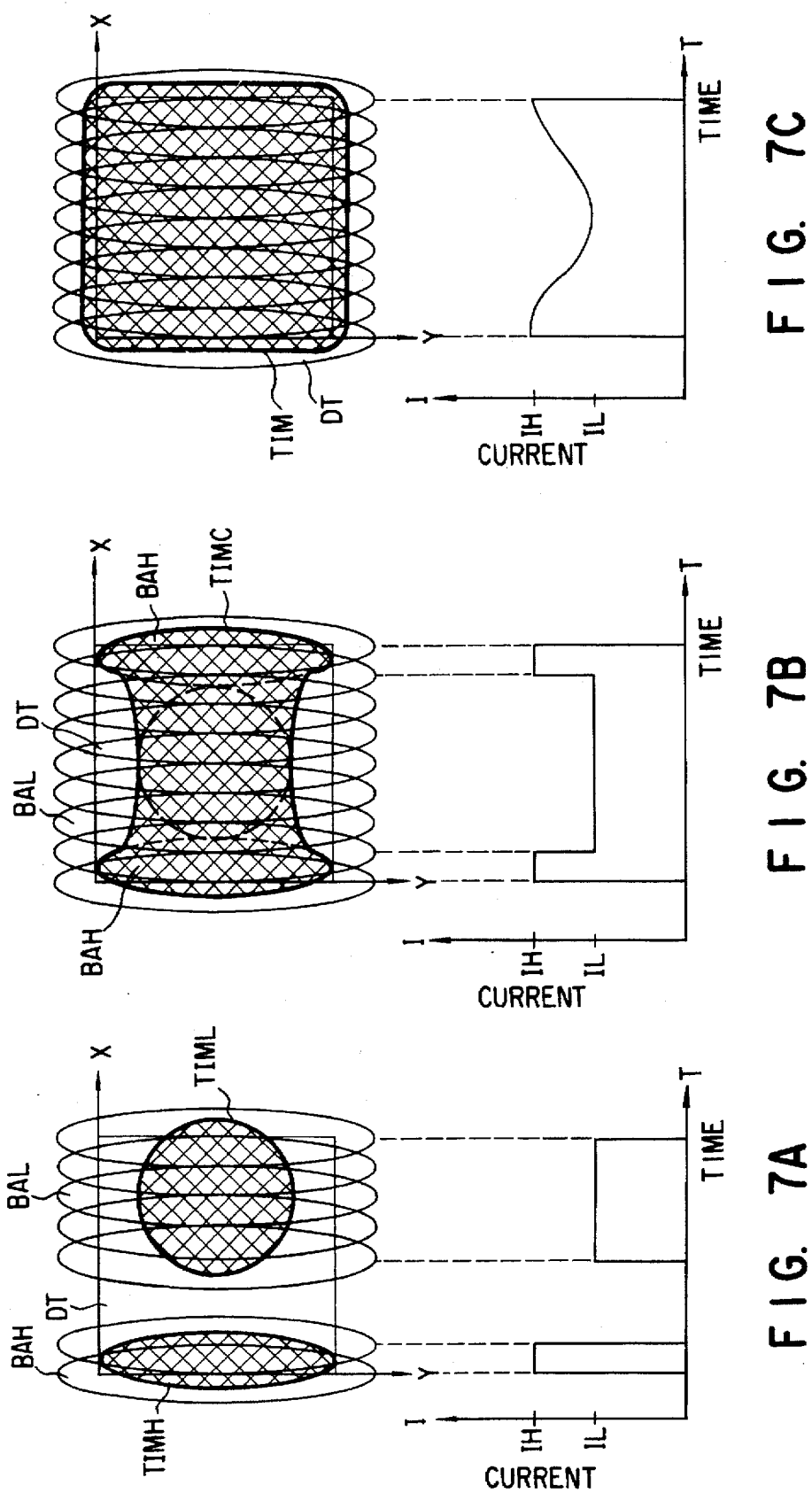

EXPOSING DEVICE HAVING POWER CONTROLLER FOR CONTROLLING LASER POWER DURING DOT EXPOSING CYCLE IN AN ELECTROPHOTOGRAPHIC PROCESS

BACKGROUND OF THE INVENTION

1. Field of the Invention

The present invention generally relates to an electrophotographic printing apparatus for printing a dot image by an electrophotographic process, and more particularly to an exposing device for selectively exposing a surface of a photosensitive image carrier during the electrophotographic process.

2. Description of the Related Art

A typical electrophotographic printing apparatus will be described taking, as an example, a laser printer equipped with a photosensitive drum serving as an image carrier. The laser printer uniformly charges the surface of a photosensitive drum rotating on a shaft in one direction and selectively exposes the charged surface of the drum, thereby forming an electrostatic latent image on the photosensitive drum. The latent image is developed by supplying the photosensitive drum with a developer which selectively adheres to the latent image, so that a visible developer image is formed. The visible image is then transferred from the drum to paper.

The printer includes an exposure section for selectively exposing the charged surface of the drum. The exposure section has a laser light source, a slit, a polygon mirror, an aspherical lens, and the like of an optical system. The laser light source emits a laser mean toward a polygon mirror rotated in one direction. The slit is placed between the laser light source and the polygon mirror to define the cross-sectional shape of the laser beam. The laser beam from the slit is reflected by the polygon mirror and lead to the surface of the drum via the aspherical lens. The polygon mirror has reflecting planes each of which changes the direction of reflection of the incident laser beam according to the angle of rotation, thereby permitting the laser beam to scan the scanning range in a main-scanning direction X parallel to the shaft of the photosensitive drum. The aspherical lens is used to keep the laser beam at a constant scanning or moving speed. The photosensitive drum is rotated by a preset angle for each scanning in the main-scanning direction X, and the surface thereof is moved in a sub-scanning direction Y perpendicular to the main-scanning direction X.

Assume that the laser light source is driven by a drive current I of levels Ia, Ib, and Ic for a predetermined period of time. In FIGS. 1A, 1B, and 1C, BAa, BAb, and BAc denote irradiation areas irradiated by laser beams obtained when the drive current I is set at levels IA, Ib, and Ic, respectively; TIMa, TIMb, and TIMc denote exposure areas completely exposed in the irradiation areas BAa, BAb, and BAc to enable development, respectively; and DT denotes a dot frame defining a square of one dot to which a developer should be adhered. When the laser beam passes the slit, the cross-section of the laser beam is changed from a circular shape to an oval shape. The irradiation areas are oval areas having substantially the same size. However, since the power of the laser beam has a Gaussian distribution in the diameter direction, parts of the irradiation areas BAa, BAb, and BAc form the exposure areas TIM, TIMb, and TIM c. In addition, the size of the exposure area becomes is increased in proportion to the power of the laser beam.

The laser light source is continuously driven during the period in which the laser beam moves across the drum surface by a distance corresponding to the width of the dot frame DT, thereby exposing the drum surface for one dot. If the height (the diameter in the sub-scanning direction) of the exposure area is lower than that of the dot frame DT, a developer can not be adhered to all the square of the dot frame DT at the time of development. In a case where a plurality of dots are continued or associated with each other to obtain a whole black image, gaps are created between the dots. Therefore, the drive current I is fixed at a predetermined level which can obtain an exposure area TIM1 entirely overlapping the square of the dot frame DT. Further, since the photosensitivity of the photosensitive drum is generally deteriorated in proportion to the total use period, the drive current I of the laser light source must be set higher than the predetermined level with taking the deterioration into account. Accordingly, the exposure area TIM1 is inevitably enlarged as an exposure area TIM2.

FIG. 3 shows two exposure areas TIM2 separated from each other in the main-scanning direction X. The width of a space SDW2 is remarkably narrower than that of the dot frame DT between the exposure areas TIM2. Therefore, it is difficult to draw clear and thin lines extending in the sub-scanning direction Y.

The above problem can be solved if the size of the dot frame is made small. However, this tends to increase the printing period and decrease the power efficiency.

SUMMARY OF THE INVENTION

An object of the present invention is to provide an exposing device which can improve the printing quality without decreasing the printing speed.

According to the present invention, an exposing device comprises a laser light source for emitting a laser beam; a light source driving section for selectively driving the laser light source in dot exposing cycles; and an optical scanning section for restricting a width of the laser beam in one scanning direction and scanning a photosensitive surface of an image carrier in the scanning direction with the laser beam emitted from the laser light source to form one of exposure and non-exposure dots for each exposing cycle. The light source driving section includes a power controller for changing a laser power of the laser beam during each dot exposing cycle assigned to an exposure dot adjacent to a non-exposure dot, in a control pattern that causes the exposure dot to have a substantially square shape.

With the above-described exposing device, the power control circuit changes a laser power of the laser beam in a predetermined control pattern during each dot exposing cycle assigned to form an exposure dot adjacent to a non-exposure dot. The control pattern is preferably predetermined such that the laser power is changed from a first level to a second level lower than the first level in a first half of the dot exposing cycle, and from the second level to the first level in the remaining half of the dot exposing cycle. When the laser power is changed during the period of a dot exposing cycle, the shape of the exposure dot is set to be substantially a square rather than a circle. That is, the above control pattern can reduce that part of the exposure dot which extends from a dot frame defining a square of one dot. The width of a non-exposure dot or space is not made remarkably narrower than that of the dot frame, even if two exposure dots are formed on the both sides of the non-exposure dot. In this case, the size of the dot frame is not required to be made small. Therefore, it is possible to improve the printing quality without decreasing the printing speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a block diagram schematically showing a circuit configuration of an electrophotographic printing apparatus according to one embodiment of the present invention;

FIGS. 7A, 7B, and 7C are diagrams for illustrating shapes of exposure areas obtained according to various control patterns.

DETAILED DESCRIPTION OF THE PREFERRED EMBODIMENT

An electrophotographic printing apparatus according to one embodiment of the present invention will be described with reference to accompanying drawings.

Figure 1C:
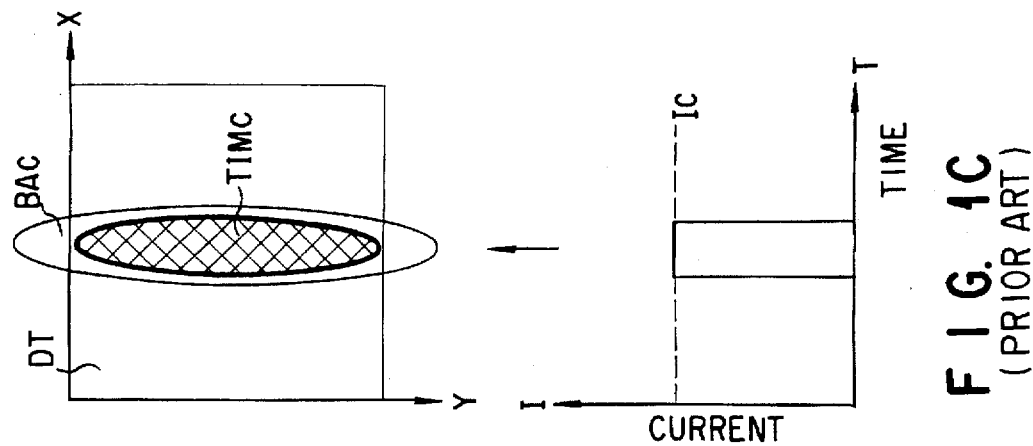
FIGS. 1A, 1B, and 1C are diagrams showing relationships between irradiation areas and exposure areas obtained by laser beams emitted when a drive current of a laser light source is set to different levels.
Figure 1B:
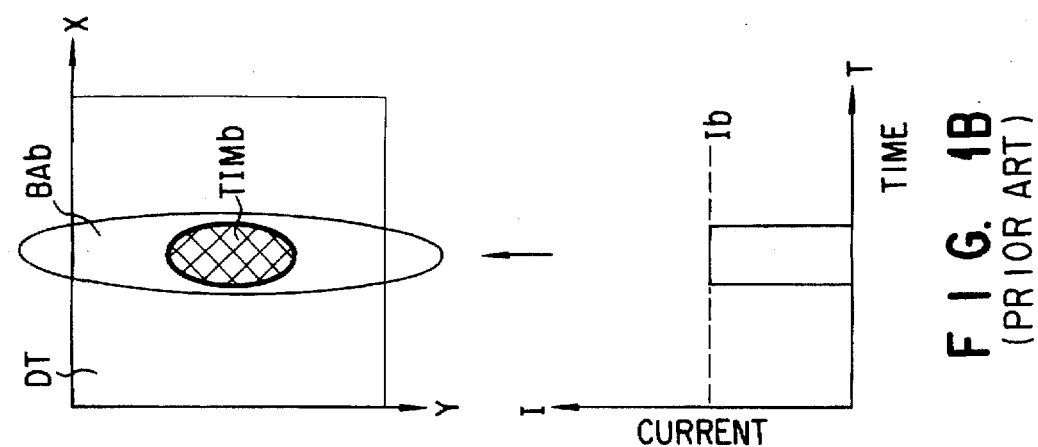
Figure 1A:
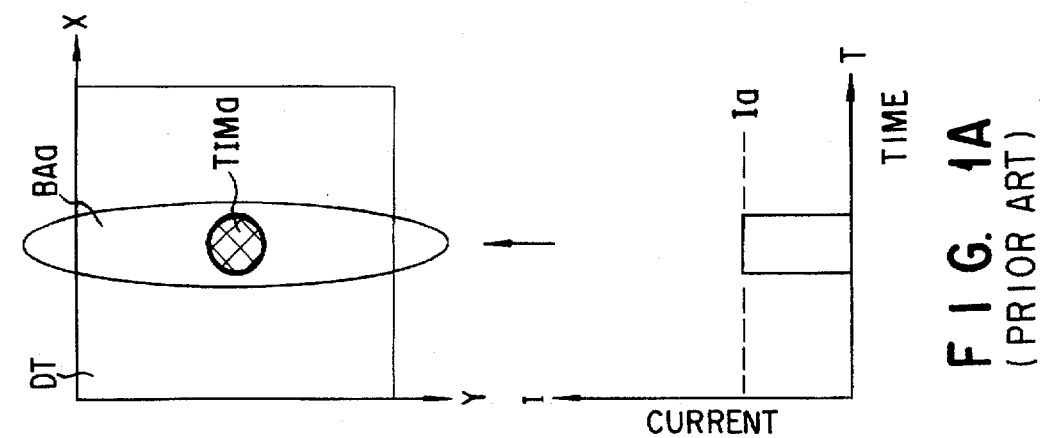
Figure 2:
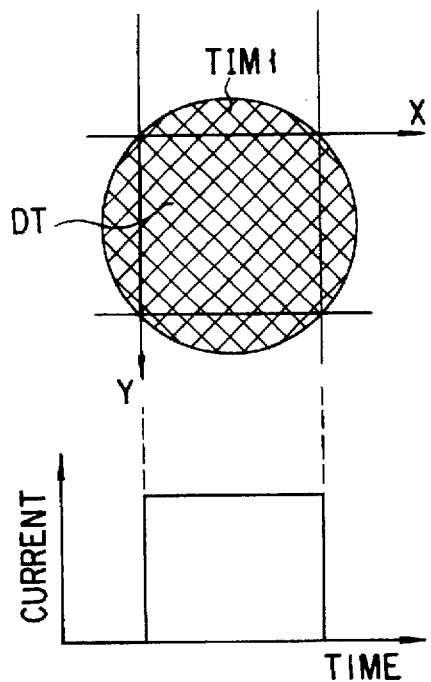
FIG. 2 is a diagram showing an exposure area which entirely overlaps the square of a dot frame when the drive current of the laser light source is properly selected.
Figure 5:
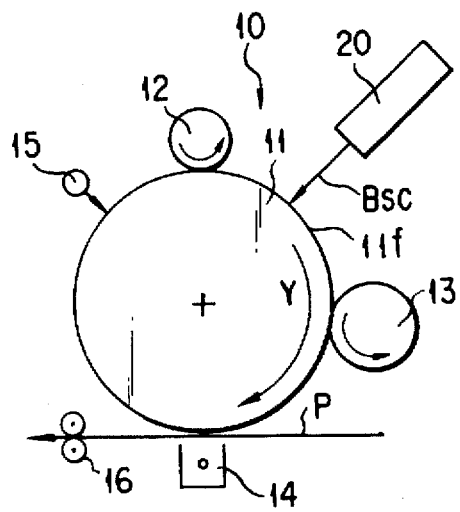
FIG. 5 is a cross-sectional view showing an arrangement of an electrophotographic process unit shown in FIG. 4.
Figure 3:
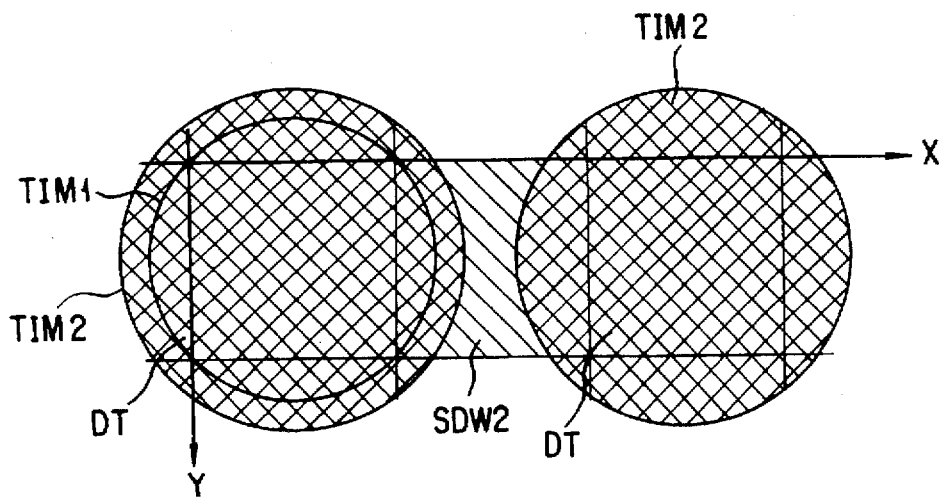
FIG. 3 is a diagram for illustrating that two exposure areas of dots can not be separated at a sufficient distance when a conventional exposing device is used.

FIG. 4 schematically shows a circuit configuration of the electrophotographic printing apparatus, and FIG. 5 schematically shows an arrangement of an electrophotographic process unit 10. The electrophotographic printing apparatus includes a photosensitive drum 11, a charging section 12, an exposing section 20, a developing section 13, a transferring section 13, a discharging section 15, and a fixing section 16. The photosensitive drum 11 is used as an image carrier and driven to rotate clockwise on a shaft thereof. The charging section 12 electrostatically charges the surface 11f of the photosensitive drum 11 to have a uniform potential (−500V). The exposing section 20 selectively exposes the charged surface 11f with a laser beam to form an electrostatic latent image (−50V) on the photosensitive drum 11. The developing section 14 supplies the photosensitive drum 11 with a developer which selectively adheres to the electrostatic latent image, thereby developing the electrostatic latent image to a visible developer image. The transferring section 14 transfers the developer image on the photosensitive drum 11 onto paper P which is fed as the photosensitive drum 11 rotates. The discharging section 15 removes unnecessary charges from the photosensitive drum 11. The fixing section 16 applies heat and pressure to the paper P fed from the transferring section 14 to thereby fix the transferred image to the paper P.

The exposing section 20 includes a laser light source section 22, a polygon mirror 21, an aspherical lens FL, a slit 27, and the like of an optical system. The laser light source section 22 is formed of a laser diode 23 and a laser driver 24. The laser diode 23 emits a laser beam toward the polygon mirror 21 rotated in one direction. The slit 27 is placed between the laser diode 23 and the polygon mirror 21 to define the cross-sectional shape of the laser beam. The laser beam from the slit 27 is reflected by the polygon mirror 21 and lead to the surface 11f of the photosensitive drum 11 via the aspherical lens FL. The polygon mirror 21 has reflecting planes each of which changes the direction of reflection of the incident laser beam according to the angle of rotation, thereby permitting the laser beam to scan the scanning range in a main-scanning direction X parallel to the shaft of the photosensitive drum 11. The aspherical lens FL is used to keep the laser beam at a constant scanning or moving speed. The photosensitive drum 11 is rotated by a preset angle for each scanning in the main-scanning direction X, and the surface thereof is moved in a sub-scanning direction Y perpendicular to the main-scanning direction X.

The exposing section 20 further includes a laser control circuit 30. The laser control circuit 30 has an ON-signal generator 31, an oscillator 32, a beam detector 33, a laser power controller 34, a reference laser power setting unit 35, and a laser power detector 36. The beam detector 33 is disposed at a position close to an exposure starting end of the photosensitive drum surface 11f to converts the laser beam Bsc from the polygon mirror 21 to an electrical detection pulse signal BDT. The oscillator 32 generates a reference clock signal CLK at dot exposing cycles. The ON-signal generator 31 responds to the detection pulse signal BDT to supply the reference clock signal CLK to the laser driver 24 as an ON-signal LDON and to the laser power controller 34 as a scanning monitor signal LMEN, during a preset period corresponding to a scanning range of the photosensitive drum surface 11f. The laser power controller 34 is controlled by a print control section 50. The laser power controller 34 determines whether an exposure for one dot must be carried out at a dot coordinate in the main-scanning direction X which is specified according to the scanning monitor signal LMEN, and supplies a drive current control signal CNT of a level corresponding to a laser power setting signal STD from the reference laser power setting unit 35 so as to carry out the exposure for one dot. When a power adjusting signal COR is supplied from the print control section 50, the drive current control signal CNT has a level varied with the power adjusting signal COR, irrespective of the laser power setting signal STD. The laser driver 24 supplies to the laser diode 23 a drive current I which selectively rises from a beam detection level in synchronism with the ON-signal LDON. When the drive current rises, a level of the drive current I is set according to that of the drive current control signal CNT. The laser diode 23 emits a laser beam having a power corresponding to the level of the drive current I. When the drive current I is at a beam detection level, the laser diode 23 emits a laser beam which can be detected by the beam detector 33 and can not expose the photosensitive drum surface 11f. The laser power detector 36 detects a power of the laser beam emitted from the laser diode 23, and supplies a power monitor signal LBM corresponding to the detected power to the laser power controller 34. The laser power controller 34 compares the drive current control signal CNT with the power monitor signal LBM, and changes the drive current control signal based on a result of comparison so as to reduce a driving error of the laser diode 23.

The above-mentioned print control section 50 includes a CPU 51, a ROM 52, a RAM 53, an operation panel 54, an indicator panel 55, a communication interface 56, an input and output circuit 57, and an exposure controller 60. The CPU 51 control an entire sequence of an electrophotographic printing operation. The ROM 52 stores a control program of the CPU 51, and other fixed data, and has a memory area 52P storing control pattern data used for changing the drive current I of the laser diode 23, or laser power in a predetermined control pattern during a period corresponding to the dot exposing cycle. The RAM 53 stores dot image data and the like produced by the CPU 51. The operation panel 54 has a plurality of input keys for inputting various instructions to the CPU 51, and the indicator panel 55 indicates a state of the printing operation. The communication interface 56 is provided for receiving print data and other data supplied from an external host computer 1. The exposure controller 60 supplies dot data for each dot coordinate to the laser power controller 34 under the control of the CPU 51, and supplies thereto a power adjusting signal COR varied according to the control pattern data when adjustment of laser power is required in an exposure carried out for the dot data.

An exposing operation of the electrophotographic printing apparatus will be described below.

When the exposing operation begins, the laser diode 23 emits a laser beam for beam detection. As the polygon mirror 21 rotates, the laser beam is detected by the beam detector 33. At the time of detection, the ON-signal generator 31 supplies the reference clock signal CLK from the oscillator 32 to the laser driver 24 as an ON-signal LDON and to the laser power controller 34 as a scanning monitor signal LMEN. The laser driver 24 supplies to the laser diode 23 a drive current I which selectively rises in synchronism with the ON-signal LDON. As the polygon mirror 21 rotates, the photosensitive drum surface 11f is scanned in the main-scanning direction X with the laser beam emitted from the laser diode 23, and selectively exposed in units of dots.

In the exposing operation, the CPU 51 supplies the control pattern data stored in the memory area 52P and dot data for one scanning line stored in the RAM 53. Further, the CPU 51 sets a power adjusting mode on each dot data "1" which is located next to dot data "0" within the dot data for one scanning line. (the dot data "0" represents a non-exposure dot, and the dot data "1" represents an exposure dot.) The exposure controller 60 supplies to the laser power controller 34 dot data for each dot coordinate in the main-scanning direction X, and supplies thereto the power adjusting signal COR which varies according to the control pattern data when the power adjusting mode is set on the dot data.

The laser power controller 34 determines to carry out an exposure for one dot when dot data "1" is supplied from the exposure controller 60, and supplies to the laser driver 24 a drive current control signal CNT having a level corresponding to the laser power setting signal STD. When the power adjusting signal COR is supplied from the exposure controller 60 along with the dot data, the laser power controller 34 supplies to the laser driver 24 a drive current control signal CNT having a level corresponding to the power adjusting signal COR. The laser driver 24 supplies to the laser diode 23 a drive current I which selectively rises from the beam detection level in synchronism with the ON-signal LDON. Accordingly, the laser beam emitted from the laser diode 23 has a power corresponding to the drive current I.

Figure 6:
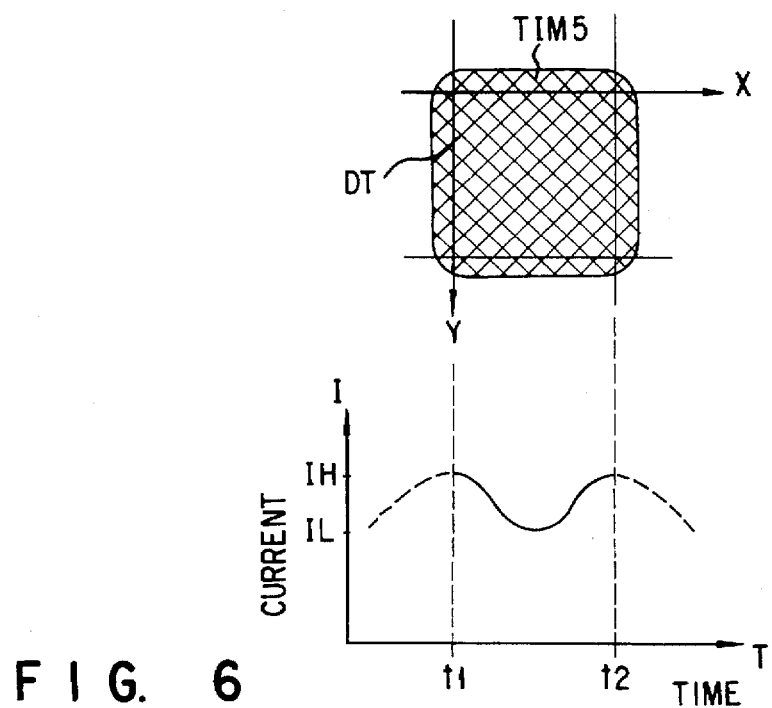
FIG. 6 is a diagram showing a control pattern for controlling a drive current of a laser light source shown in FIG. 4 and an exposure area of one dot obtained according to the control pattern.
Figure 8:
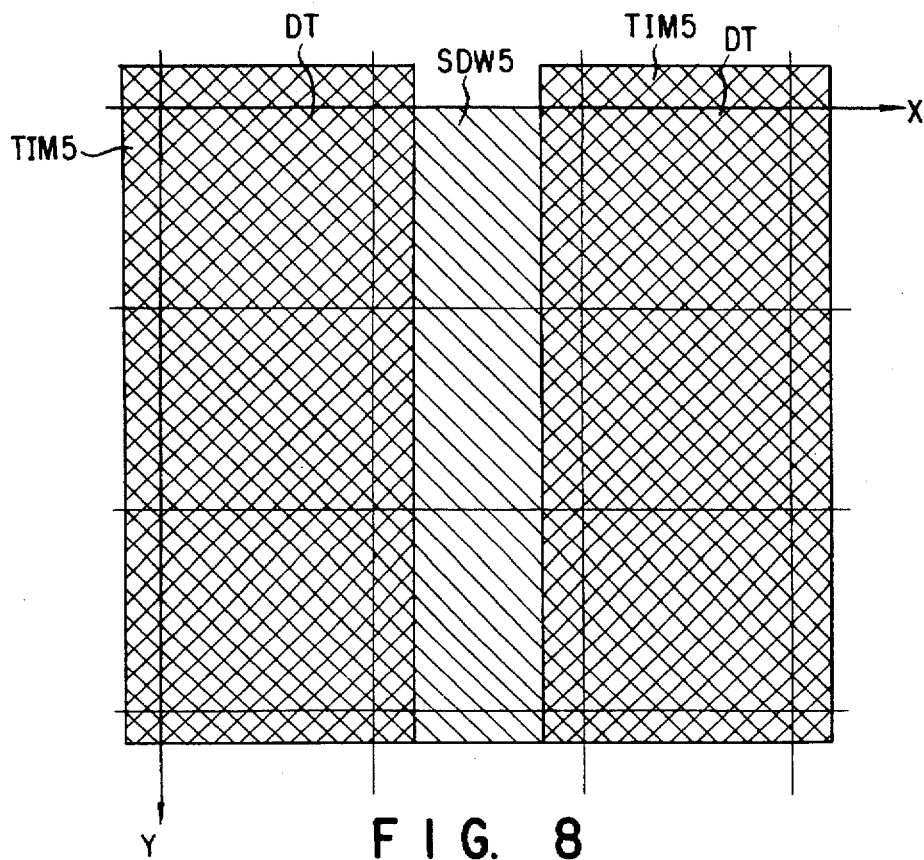
FIG. 8 is a diagram showing a space located between two lines formed of continuous exposure areas of dots.

When the power adjusting signal COR is not supplied from the exposure controller 60 to the laser power controller 34, the drive current I is maintained, for example, at a maximal level IH during a period of the dot exposing cycle. In contrast, when the power adjusting signal COR is supplied from the exposure controller 60 to the laser power controller 34, the drive current I varies in a predetermined control pattern shown in FIG. 6 during the period of the dot exposing cycle. That is, the drive current I is set to the maximal level IH at a boundary between a non-exposure dot and an exposure dot, and a minimal level IL at a center portion of the exposure dot. This causes an exposure area TIM5 shown in FIG. 6 to have a size equal to or slightly larger than that of the dot frame DT and a shape similar to that of the dot frame DT.

FIGS. 7A, 7B, and 7C show the shapes of exposure areas obtained according to three control patterns used for changing the drive current I of the laser diode 23. For example, when the drive current I is set to the maximal level IH and the minimal level IL as shown in FIG. 7A, an exposure area TIMH is formed within an irradiation area BAH of a laser beam, and an exposure area TIML is formed within an an irradiation area BAL of a laser beam. As can be seen from FIG. 7A, the height of the exposure area TIML (diameter in the sub-scanning direction Y) is set lower than that of the exposure area TIMH.

Moreover, when the drive current I is set to the maximal level IH for scanning the both ends of the dot frame DT and the minimal level IL for scanning a portion between the both ends of the dot frame DT, an exposure area TIMC shown in FIG. 7B is formed within irradiation areas BAH and BAL. However, the height of the exposure area TIMC is set lower than that of the central portion of the dot frame DT.

Accordingly, it is preferable to vary the drive current I in the control pattern shown in FIG. 7C. In this case, an exposure area TIM may have a size equal to or slightly larger than that of the dot frame DT and a shape similar to that of the dot frame DT.

When a plurality of dot exposure areas TIM5 are arranged in the sub-scanning direction Y to form two lines, the width of a space SDW5 between the lines can be wider as compared with the width of each line.

With the electrophotographic printing apparatus of the embodiment described above, the laser control circuit 30 changes a laser power of the laser beam in a predetermined control pattern during each dot exposing cycle assigned to form an exposure dot adjacent to a non-exposure dot. The control pattern is determined such that the laser power is set to be a maximal level at a boundary between the non-exposure dot and exposure dot and a minimal level at a center portion of the exposure dot. When the laser power is changed during the period of a dot exposing cycle, the shape of the exposure dot is set to be substantially a square rather than a circle. That is, the above control pattern can reduce that part of the exposure dot which extends from a dot frame defining a square of one dot. The width of a non-exposure dot or space is not made remarkably narrower than that of the dot frame, even if two exposure dots are formed on the both sides of the non-exposure dot. In this case, the size of the dot frame is not required to be made small. Therefore, it is possible to improve the printing quality without decreasing the printing speed.

In the above embodiment, the control pattern data is stored in the memory area 52P of the ROM 52. However, the control pattern data can be stored in an Electrically Erasable and Programmable ROM (EEPROM) or a floppy disk which is removably set in the printing apparatus. Further, an additional logic circuit can be provided to produce the control pattern data.

Moreover, the power adjusting signal COR can represent a differential value with respect to the laser power setting signal STD. In this case, the power adjusting signal COR and the laser power setting signal STD is combined to obtain the drive current control signal CNT.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An exposing device comprising:

a laser light source for emitting a laser beam;

a light source driving section for selectively driving said laser light source in dot exposing cycles; and an optical scanning section for restricting a width of the laser beam in one scanning direction and scanning a photosensitive surface of an image carrier in the scanning direction with the laser beam emitted from said laser light source to form one of exposure and non-exposure dots for each exposing cycle; and wherein said light source driving section includes a power controller for changing a laser power of the laser beam during each dot exposing cycle assigned to an exposure dot adjacent to a non-exposure dot, in a control pattern that causes the exposure dot to have a substantially square shape; and wherein said control pattern is predetermined such that the laser power is linearly changed from a first level to a second level lower than the first level in a first half of the dot exposing cycle, and from the second level to the first level in the remaining half of the dot exposing cycle.

2. An exposing device according to claim 1, wherein said light source driving section comprises:

a memory which stores control pattern data representing the predetermined control pattern; and a processing section which supplies the control pattern data stored in the memory to said laser power controller during each dot exposing cycle assigned to form an exposure dot adjacent to a non-exposure dot.

3. An exposing device according to claim 2, wherein said optical scanning section includes a slit for causing a cross-section of the laser beam emitted from said laser light source to have an oval shape.

* * * * *